United States Patent
Hama et al.

(10) Patent No.: US 8,394,476 B2
(45) Date of Patent: Mar. 12, 2013

(54) POLYESTER RESIN BOTTLE AND METHOD OF PRODUCING THE SAME

(75) Inventors: Takashi Hama, Sodegaura (JP); Toyoaki Sasaki, Sodegaura (JP); Kunio Tomita, Sodegaura (JP); Takayuki Okuno, Sodegaura (JP); Yasuo Kurosaki, Yokohama (JP)

(73) Assignee: Mitsui Chemicals, Inc., Tokyo (JP)

( * ) Notice: Subject to any disclaimer, the term of this patent is extended or adjusted under 35 U.S.C. 154(b) by 474 days.

(21) Appl. No.: 11/587,374

(22) PCT Filed: May 21, 2005

(86) PCT No.: PCT/JP2005/008721
§ 371 (c)(1),
(2), (4) Date: Oct. 24, 2006

(87) PCT Pub. No.: WO2005/110715
PCT Pub. Date: Nov. 24, 2005

(65) Prior Publication Data
US 2007/0178267 A1  Aug. 2, 2007

(30) Foreign Application Priority Data

May 14, 2004 (JP) ................................. 2004-144962
Dec. 27, 2004 (JP) ................................. 2004-378240

(51) Int. Cl.
*B29D 22/00* (2006.01)

(52) U.S. Cl. .................... 428/36.92; 428/34.1; 428/35.7; 264/454; 264/521

(58) Field of Classification Search ............... 525/326.4, 525/326.2; 428/35.7, 36.92; 425/533; 215/375, 215/383, 379; 264/521, 530, 532, 83
See application file for complete search history.

(56) References Cited

U.S. PATENT DOCUMENTS

| | | | | |
|---|---|---|---|---|
| 4,550,007 A * | 10/1985 | Ohtsu et al. | .................... | 264/521 |
| 4,894,268 A | 1/1990 | Greenwood et al. | | |
| 5,250,335 A * | 10/1993 | Maruhashi et al. | ........ | 428/36.92 |
| 5,352,402 A * | 10/1994 | Orimoto et al. | ............... | 264/526 |
| 5,641,548 A * | 6/1997 | Yamamoto et al. | .......... | 428/35.7 |
| 6,626,324 B1 * | 9/2003 | Boyd | ............................ | 220/609 |
| 6,890,621 B2 | 5/2005 | Nakamura et al. | | |
| 2004/0065984 A1 | 4/2004 | Ota et al. | | |

FOREIGN PATENT DOCUMENTS

| CN | 1035080 A | 8/1989 |
|---|---|---|
| CN | 1338987 A | 3/2002 |
| JP | 57-61531 A | 4/1982 |
| JP | 3-29736 A | 2/1991 |
| JP | 4-97820 A | 3/1992 |
| JP | 5-200842 A | 8/1993 |
| JP | 2520736 | 5/1996 |
| JP | 10-16934 A | 1/1998 |
| JP | 2001-040101 A | 2/2001 |
| JP | 2001-179810 A | 7/2001 |
| JP | 2003-103610 A | 4/2003 |
| TW | 499383 B | 8/2002 |

OTHER PUBLICATIONS

"Saturated Polyester Resin Handbook," Yuki, Kazuo, Ed., Nikkan Kogyo Shimbun, Ltd., (1989), with partial English abstract of a marked section.

* cited by examiner

*Primary Examiner* — Ellen S Wood (74) *Attorney, Agent, or Firm* — Birch, Stewart, Kolasch & Birch, LLP (57) ABSTRACT

It is an object of the present invention to provide a hollow bottle made of polyester, which has excellent heat resistance and is not likely to undergo deformation or change in capacity even if a liquid of high temperature is filled therein. The present invention relates to a hollow bottle formed by blow molding polyester, which has a thickness in the range of 200 to 400 µm, and satisfies that $\Delta d = d_1 - d_2$ is not less than $-7$ kg/m$^3$ and more than 7 kg/m$^3$, with d1 [kg/m$^3$] being a density of a part ranging from an outer surface up to 50 µm inward, and d2 [kg/m$^3$] being a density of a part of the body portion ranging from an inner surface up to 50 µm inward. The polyester is preferably polyethylene terephthalate, and it is preferable that d1=1370 to 1375 kg/m$^3$, while d2=1373 to 1378 kg/m$^3$.

3 Claims, 3 Drawing Sheets

POLYESTER RESIN BOTTLE AND METHOD OF PRODUCING THE SAME

TECHNICAL FIELD

The present invention relates to a polyester resin hollow bottle having high heat resistance.

BACKGROUND ART

In general, a variety of resins are employed as the material for containers of seasonings, oils, beverages, cosmetics, detergents and the like, in accordance with the type of the content matter to be filled and the purpose of use.

Among these polyester resins, polyethylene terephthalate has excellent mechanical strength, heat resistance, transparency and gas barrier property, and thus is suitable as the material for containers holding beverages such as juices, soft drinks, carbonated beverages and the like in particular. For the container for beverages, hollow bottles obtained by blow molding polyethylene terephthalate are normally used.

When a beverage is sterilized by heating and filled in a bottle, the bottle is required to have heat resistance. Specifically, the bottle is required not to undergo deformation or change in capacity when a liquid of high temperature is filled therein. In order to impart heat resistance to a bottle, a method of enhancing the density of the bottle body portion by heating the mold used in stretch blow molding to a temperature of, for example, 130° C. or greater to subject the bottle to heat treatment (heat setting), is disclosed in, for example, Patent Document 1 or Non-Patent Document 1, p. 653. However, there still is a demand for a bottle having better heat resistance.

[Patent Document 1] JP-A-4-97820
[Patent Document 2] JP-A-5-200842
[Non-Patent Document 1] "Saturated Polyester Resin Handbook", Yuki, Kazuo, Ed., Nikkan Kogyo Shimbun, Ltd. (1989)

DISCLOSURE OF THE INVENTION

It is an object of the present invention to solve the above-mentioned problems and thus to provide a hollow bottle made of polyethylene terephthalate, which has high heat resistance and does not undergo deformation or change in capacity even if a liquid of high temperature is filled therein.

The present inventors have studied extensively to solve such problems, and as a result, they have found that it is insufficient only to increase the density of the entire polyester bottle body portion, and the bottle heat resistance can be further enhanced by reducing a difference between densities of an inner surface layer and an outer surface layer of the body portion, which has led to completion of the invention.

That is, the summary of the invention is:

(1) A hollow bottle formed by blow molding polyester, which has a thickness in the range of 200 to 400 μm, and satisfies that $\Delta d = d_1 - d_2$ is not less than $-7$ kg/m$^3$ and not more than 7 kg/m$^3$, with $d_1$ [kg/m$^3$] being a density of a part ranging from an outer surface up to 50 μm inward, and $d_2$ [kg/m$^3$] being a density of a part ranging from an inner surface up to 50 μm inward. The thickness as used herein is a value measured at the body portion of the bottle, and the term 'from the outer surface or from the inner surface up to 50 μm inward' means the range from the respective surfaces up to a depth of 50 μm in the thickness direction of the bottle.

Furthermore, the polyester is preferably a polyethylene terephthalate with the outer surface and inner surface having specific densities. That is, a particularly preferred embodiment of the invention is:

(2) A hollow bottle formed by blow molding polyethylene terephthalate, which has a thickness of a bottle body portion in the range of 200 to 400 μm, and satisfies that $d_1 = 1370$ to 1375 kg/m$^3$ and $d_2 = 1373$ to 1378 kg/m$^3$, and that $\Delta d = d_1 - d_2$ is not less than $-7$ kg/m$^3$ and not more than 7 kg/m$^3$, with $d_1$ [kg/m$^3$] being a density of a part of the body portion ranging from an outer surface up to 50 μm inward, and $d_2$ [kg/m$^3$] being a density of a part of the body portion ranging from an inner surface up to 50 μm inward.

The hollow bottle of (2) formed from polyethylene terephthalate is preferably such that a density of the entire body portion is in the range of 1370 to 1380 kg/m$^3$.

(3) The hollow bottle of (2), which is a bottle made of polyethylene terephthalate resin, wherein a ratio of a difference between a capacity of the bottle measured after molding and a capacity of the bottle measured after filling hot water at 100° C. therein and cooling to the capacity of the bottle measured after molding is 2% or less, is more preferred.

Moreover, a haze of a plate whose thickness is 300 μm is preferably 1.0 to 10.0%.

A method of producing a hollow bottle by blow molding a preform made of polyethylene terephthalate resin, which comprises adjusting an outer surface temperature of the preform, T1, to the range of 120 to 160° C., adjusting an inner surface temperature of the preform, T2, to the range of 110 to 150° C., and carrying out blow molding in a temperature range satisfying that $-10°\text{C.} \leq (T2-T1) \leq 10°\text{C.}$, is suitably used as a method of producing such hollow bottle.

EFFECT OF THE INVENTION

According to the invention, there is provided a polyester resin bottle having high heat resistance, that is, a hollow bottle in which deformation or change in capacity occurring upon filling a liquid of high temperature therein is suppressed.

REFERENCE NUMERAL

| | |
|---|---|
| 1 | Vent Plug Portion (Non-Stretched Portion) |
| 2 | Height of Stretched Portion |
| 3 | External Diameter of Preform |
| 4 | Internal Diameter of Preform |
| 5 | Thickness of Preform |
| 6 | Vent Plug Portion |
| 7 | Shoulder Portion |
| 8 | Body Portion |
| 9 | Bottom Portion |
| 10 | External Diameter of Bottle |
| 11 | Internal Diameter of Bottle |
| 12 | Preform |
| 13 | Short Wavelength Infrared Heater |
| 14 | Blow Mold |
| 15 | Stretch Rod |
| 16 | Blow Air |
| 17 | Cooling Air |

BEST MODE FOR CARRYING OUT THE INVENTION

Hereinafter, molding of the polyester resin bottle according to the present invention will be explained in detail. For the polyester resin bottle according to the invention, it is particularly preferable to use polyethylene terephthalate resin.

The polyethylene terephthalate resin bottle of the invention is produced using a dicarboxylic acid or a derivative capable of forming an ester thereof, and a diol or a derivative capable of forming an ester thereof as the starting materials. Preferably, a polyester resin polymerized using terephthalic acid or a derivative capable of forming an ester thereof, and ethylene glycol or a derivative capable of forming an ester thereof as the starting materials, is used. Monomer units other than terephthalic acid and ethylene glycol may be also used for the copolymerization.

An aromatic dicarboxylic acid other than terephthalic acid may be specifically exemplified by phthalic acid, isophthalic acid, naphthalene dicarboxylic acid, diphenyl dicarboxylic acid, diphenoxyethane dicarboxylic acid or the like, and the amount thereof to be copolymerized is preferably 15% by mole or less in the dicarboxylic acid component.

An aliphatic diol other than ethylene glycol may be specifically exemplified by diethylene glycol, trimethylene glycol, propylene glycol, tetramethylene glycol, neopentyl glycol, hexamethylene glycol, dodecamethylene glycol or the like, and the amount thereof to be copolymerized is preferably 10% by mole or less in the aliphatic diol.

The content of terephthalic acid and ethylene glycol in total is preferably 85% by mole or greater of the total monomer units. When the total amount of terephthalic acid and ethylene glycol is less than 85% by mole, a crystallinity of the polyethylene terephthalate resin may decrease, and a hollow bottle having the density specified herein may not be obtained.

According to the invention, aliphatic dicarboxylic acids, such as adipic acid, sebacic acid, azelaic acid and decanedicarboxylic acid; alicyclic dicarboxylic acids, such as cyclohexanedicarboxylic acid; and the like may be used, together with the aromatic dicarboxylic acid, as the starting material. Also, alicyclic glycols, such as cyclohexanedimethanol; aromatic diols, such as bisphenol, hydroquinone, 2,2-bis(4-β-hydroxyethoxyphenyl)propanes, 1,3-bis(2-hydroxyethoxy) benzene and 1,4-bis(2-hydroxyethoxy)benzene; and the like may be used, together with the aliphatic diol, as the starting material. The content of these aliphatic dicarboxylic acid, alicyclic dicarboxylic acid, alicyclic glycol and aromatic diol is preferably 5% by mole or less in total.

According to the invention, polyfunctional compounds such as trimesic acid, trimethylolethane, trimethylolpropane, trimethylolmethane, pentaerythritol and the like can be also used as the starting material. The content of these polyfunctional carboxylic acid and polyfunctional alcohol is preferably 1% by mole or less in total.

The starting materials including the aromatic dicarboxylic acid or the derivative capable of forming an ester thereof, and the aliphatic diol or the derivative capable of forming an ester thereof as described above, are esterified. Specifically, first, a slurry containing the aromatic dicarboxylic acid or the derivative capable of forming an ester thereof, and the aliphatic diol or the derivative capable of forming an ester thereof is prepared.

This slurry contains 1.02 to 1.4 moles, preferably 1.03 to 1.3 moles of the aliphatic diol or the derivative capable of forming an ester thereof, relative to 1 mole of the aromatic dicarboxylic acid or the derivative capable of forming an ester thereof. This slurry is continuously fed to an esterification reaction process.

The esterification reaction is carried out, preferably using an apparatus having two or more esterification reactors connected in series under the conditions of refluxing the aliphatic diol, by removing the water generated by the reaction from the rectification column to the outside of the reactors. The reaction conditions for the esterification reaction are such that the temperature for the esterification reaction at the first stage is usually 240 to 270° C., preferably 245 to 265° C., and the pressure is usually 0.2 to 3 kg/cm$^2$G, preferably 0.5 to 2 kg/cm$^2$G; and the temperature for the esterification reaction at the final stage is usually 250 to 280° C., preferably 255 to 275° C., and the pressure is usually 0 to 1.5 kg/cm$^2$G, preferably 0 to 1.3 kg/cm$^2$G.

When the esterification reaction is carried out in two stages, the esterification reaction conditions for the first stage and the second stage respectively fall in the ranges described above. When the esterification reaction is carried out in three or more stages, the reaction conditions for the esterification reaction for the stages ranging from the second stage to the stage immediately before the final stage correspond to conditions that are intermediate between the reaction conditions of the first stage and the reaction conditions of the final stage.

For example, when the esterification reaction is carried out in three stages, the reaction temperature for the esterification reaction at the second stage is usually 245 to 275° C., preferably 250 to 270° C., while the pressure is usually 0 to 2 kg/cm$^2$G, preferably 0.2 to 1.5 kg/cm$^2$G. The reaction rate of such esterification reaction at the respective stages is not particularly limited, but it is preferable that the degree of increase in the esterification reaction rate at the respective stages is smoothly distributed. More particularly, the reaction rate preferably reaches 90% or greater, and more preferably 93% or greater, with respect to the esterification reaction product of the final stage.

An esterification product (low condensate) is obtained from these esterification processes, and the number average molecular weight of the esterification product is usually 500 to 5000. Such esterification reaction can be carried out without adding any additives other than the aromatic dicarboxylic acid and the aliphatic diol, and also can be carried out in the co-presence of a polycondensation catalyst that will be described later.

When the esterification reaction is carried out in the presence of a small amount of a tertiary amine, such as triethylamine, tri-n-butylamine and benzyldimethylamine; a quaternary ammonium hydroxide, such as tetraethylammonium hydroxide, tetra-n-butylammonium hydroxide and trimethylbenzylammonium hydroxide; and a basic compound, such as lithium carbonate, sodium carbonate, potassium carbonate, and sodium acetate, the proportion of the dioxyethylene terephthalate component unit in the polyethylene terephthalate main chain can be maintained at a relatively low level, which is preferable.

Subsequently, the obtained esterification product is supplied to a liquid phase polycondensation process. In this liquid phase polycondensation process, the esterification product is polycondensed by heating to a temperature above the melting point of the obtainable polyester under reduced pressure in the presence of a polycondensation catalyst, and distilling off the glycol generated thereby out of the reactors.

Such polycondensation reaction in the liquid phase may be carried out in a single stage or in multiple stages. When the polycondensation reaction is carried out in multiple stages, the polycondensation reaction conditions are such that the polycondensation reaction temperature at the first stage is usually 250 to 290° C., preferably 260 to 280° C., and the pressure is usually 500 to 20 Torr, preferably 200 to 30 Torr; while the polycondensation reaction temperature at the final stage is usually 265 to 300° C., preferably 270 to 295° C., and the pressure is usually 10 to 0.1 Torr, preferably 5 to 0.5 Torr.

When the polycondensation reaction is carried out in two stages, the polycondensation reaction conditions for the first stage and the second stage correspond to the ranges described above, respectively. When the polycondensation reaction is carried out in three or more stages, the polycondensation reaction conditions for the stages ranging from the second stage to the stage immediately before the final stage correspond to conditions that are intermediate between the reaction conditions of the first stage and the reaction conditions of the final stage.

For example, when the polycondensation reaction is carried out in three stages, the reaction temperature of the polycondensation reaction at the second stage is usually 260 to 295° C., preferably 270 to 285° C., and the pressure is usually in the range of 50 to 2 Torr, preferably 40 to 5 Torr. Intrinsic viscosities (IV) respectively reached in these polycondensation reaction processes are not particularly limited, but it is preferable that the degree of increase in the intrinsic viscosity at the respective stages is smoothly distributed. The intrinsic viscosity of the polyester obtained from the polycondensation reactor at the final stage is preferably in the range of 0.35 to 0.80 dl/g, more preferably 0.45 to 0.75 dl/g, and even more preferably 0.55 to 0.65 dl/g.

According to the invention, the intrinsic viscosity is calculated from the viscosity, which is measured at 25° C., of a solution obtained by dissolving under heating 0.5 g of polyester in 100 cc of a mixed solution of tetrachloroethane/phenol=50/50 (wt/wt) and cooling.

The polycondensation reaction as described above is carried out in the presence of a polycondensation catalyst such as, for example, the germanium-based or antimony-based compound described in JP-A-3-72524, or the titanium-based compound described in the international publication of WO 03-72633.

As such, the polyester obtained from the final polycondensation reactor is usually molded into a granular shape (chip shape) according to a melt extrusion molding method.

Such granular polyester has an average particle size of preferably 2.0 to 5.0 mm, and more preferably 2.2 to 4.0 mm. The granular polyester which has been subjected to the liquid phase polycondensation process in this way is, if desired, supplied to a solid phase polycondensation process.

The granular polyester may be first subjected to preliminary crystallization by heating to a temperature lower than the temperature for the solid phase polycondensation, and then supplied to the solid phase polycondensation process.

Such preliminary crystallization process may be carried out by heating the granular polyester in the dry state at a temperature of, for example, 120 to 200° C., preferably 130 to 180° C., for 1 minute to 4 hours. Alternatively, the preliminary crystallization process may be also carried out by heating the granular polyester under an atmosphere of water vapor, under an atmosphere of inert gas containing water vapor, or under an atmosphere of air containing water vapor, at a temperature of, for example, 120 to 200° C. for 1 minute or longer.

The solid phase polycondensation process to which such granular polyester is supplied comprises at least one stage, and the solid phase polycondensation reaction is carried out under the conditions such as a polycondensation temperature of usually 190 to 230° C., preferably 195 to 225° C. and a pressure of usually 1 kg/cm$^2$G to 10 Torr, preferably ambient pressure to 100 Torr, under an atmosphere of inert gas such as nitrogen gas, argon gas, carbon dioxide gas or the like. Among these inert gases, nitrogen gas is preferred.

(Molding of Preform)

Figure 1:
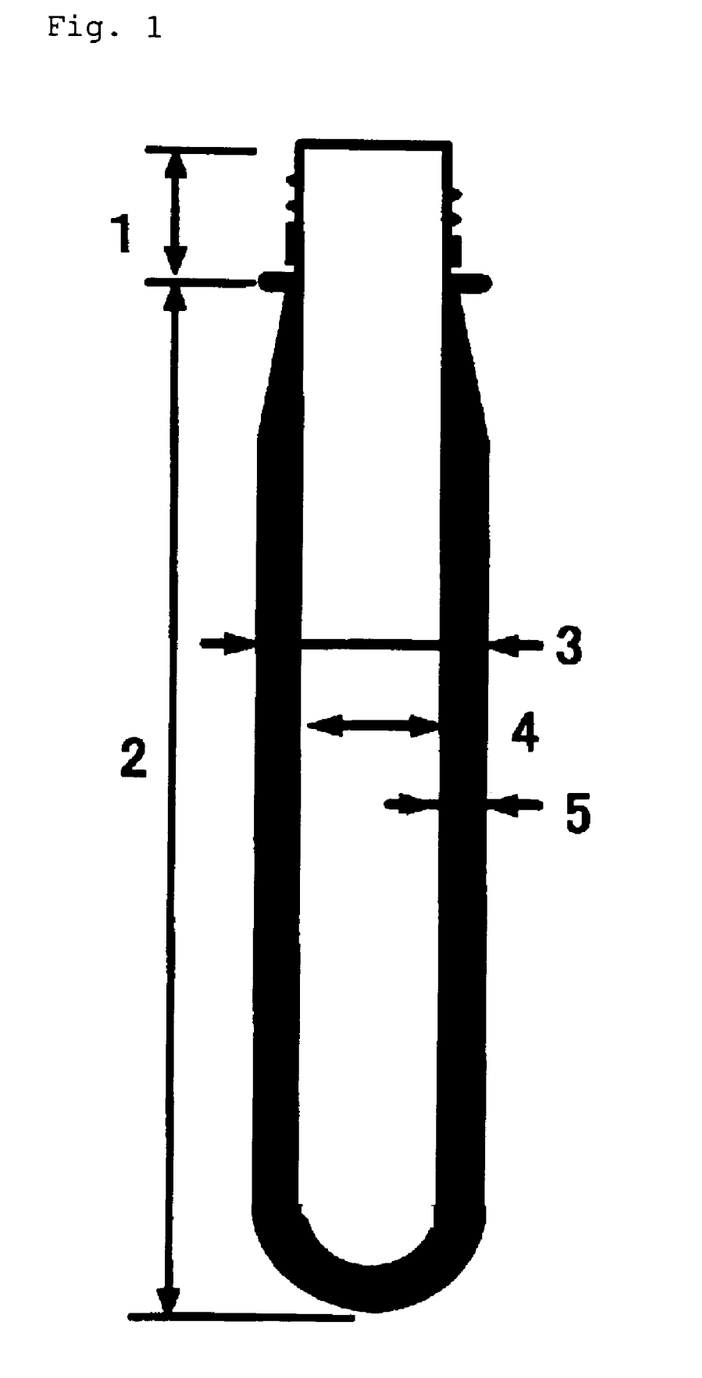
FIG. 1 shows a cross-sectional view of the preform used in the present invention.

As a method of molding a bottle, a bottle is molded by two processes of injection molding and blow molding. First, in the injection molding process, polyethylene terephthalate is injected in the molten state into a mold, cooled and drawn out so as to be molded into a preform. The preform comprises, as shown in FIG. 1, a vent plug portion (non-stretched portion) 1 and a close-bottomed stretched portion 2.

The injection molding process can be carried out using a known method such as, for example, the method described in the Saturated Polyester Resin Handbook (Yuki, Kazuo, Ed., Nikkan Kogyo Shimbun, Ltd. (1989)). The injection molding temperature is preferably 270 to 300° C.

(Molding of Polyester Resin Bottle)

Figure 2:
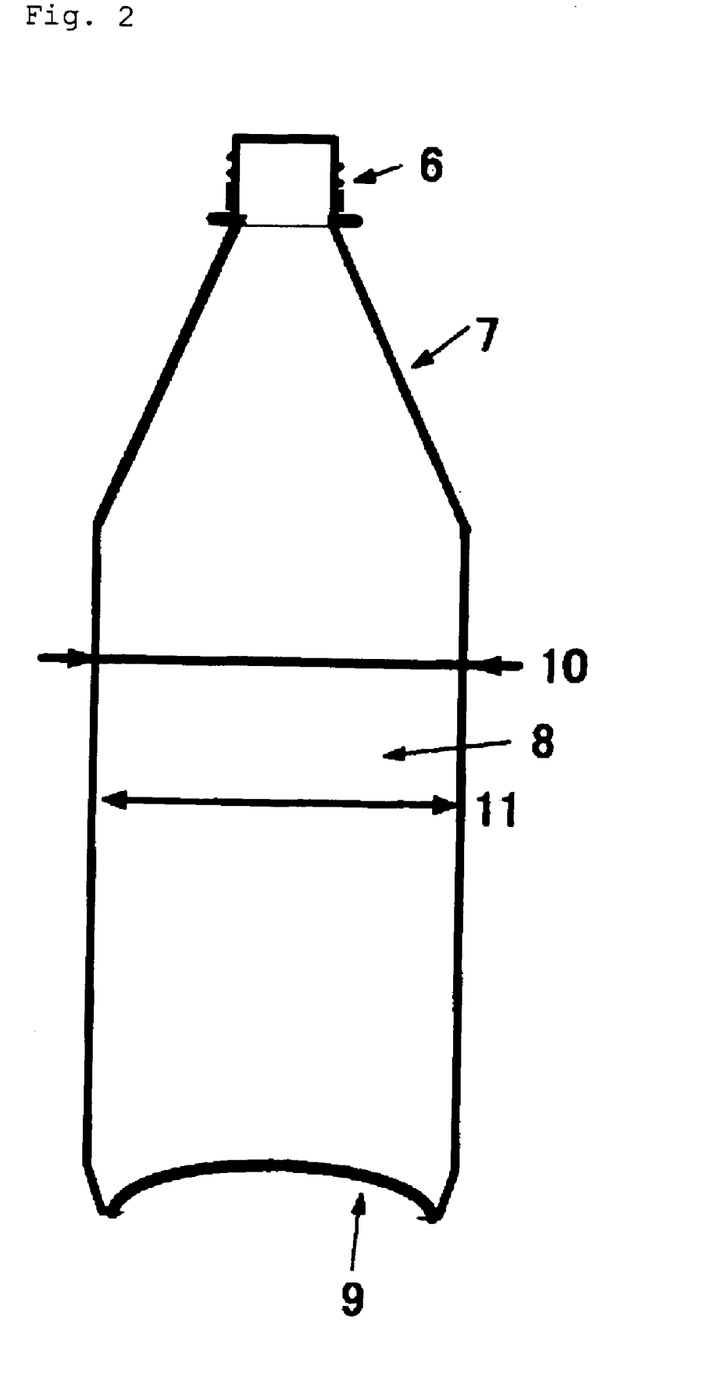
FIG. 2 shows a cross-sectional view of the hollow bottle according to the present invention.

The hollow bottle of the invention generally comprises, as described in FIG. 2, a vent plug portion 6, a shoulder portion 7 having a shape of a circular truncated cone, a cylindrical body portion 8, and a closed bottom portion 9.

Figure 3:
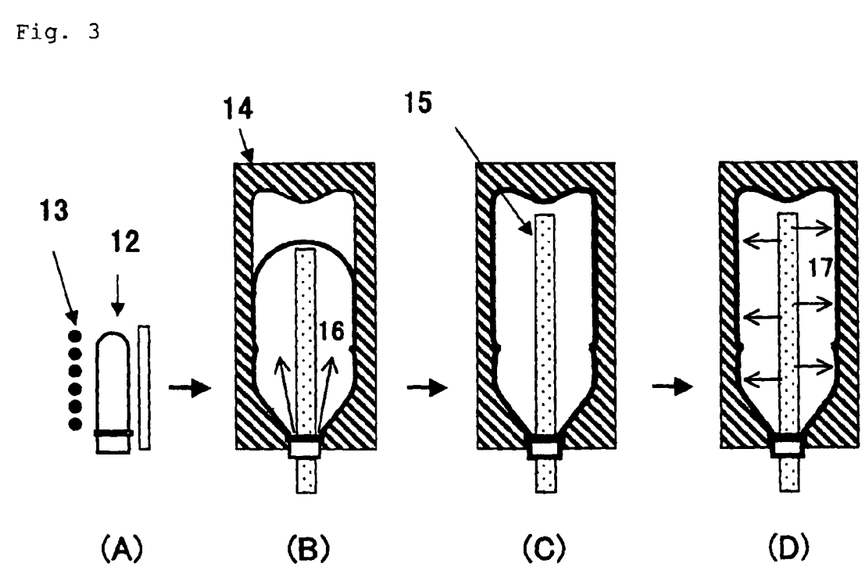
FIG. 3 shows a process of hollow blow of a preform.

The hollow bottle is obtained by blow molding the preform. FIG. 3 illustrates the blow molding process. (A) A preform 12 is generally heated to a predetermined temperature using an infrared heater 13, and then (B) is fed into a blow mold 14 having a predetermined shape, with high pressure air 16 being blown into the mold. (C) A bottle is molded by fitting the preform to the mold 14, and (D) the bottle is drawn out after cooling. The conditions for blow molding will be described later.

(Polyester Resin Bottle)

The vent plug portion preferably has a density in the range of 1337 to 1343 kg/m$^3$. The shape is preferably a screw shape so that a screw cap can be mounted thereon.

The shoulder portion has a density of preferably 1350 to 1375 kg/m$^3$, and more preferably 1355 to 1365 kg/m$^3$. The thickness is preferably in the range of 200 to 600 μm, and the shoulder portion may have unevenness or a pattern for the enhancement of strength or heat resistance.

A density of the entire body portion is preferably 1370 to 1380 kg/m$^3$, and the thickness thereof is in the range of 200 to 400 μm. The cross-sectional shape may be round or angular. Further, the body portion may have unevenness or a pattern for the enhancement of strength or heat resistance.

A density of the bottom portion is preferably 1335 to 1355 kg/m$^3$. The thickness thereof is preferably in the range of 0.5 to 4 mm, and the bottom portion may have unevenness or a pattern for the enhancement of strength or heat resistance.

(Density of the Body Portion of Hollow Product)

In order to enhance the heat resistance, the bottle body portion needs to have enhanced density. For example, in the case of a bottle having a capacity of 500 cc, a sample that is cut out from the body portion of a bottle having a height of 50 mm to 100 mm from the bottom, and a width of about 15 mm, has a density of usually 1370 to 1385 kg/m$^3$. However, in the case of a conventionally used heat resistant bottle, the difference between the densities at the inner side and the outer side in the thickness direction of the bottle is usually 8 kg/m$^3$ or larger. In particular, the density at the inner side is likely to be decreased, thus impairing the heat resistance.

In this regard, the polyester resin bottle of the invention has a small difference between the densities at the inner side and the outer side of the bottle body portion, and has higher heat resistance compared with conventional bottles. In order to enhance the heat resistance of the bottle, the difference between the densities at the inner side and the outer side in the thickness direction of the bottle is preferably −7 to 7 kg/m$^3$, and more preferably −3 to 3 kg/m$^3$.

The inner side as described herein means a part ranging from the inner surface of bottle up to 50 μm in the thickness direction, and the outer side means a part ranging from the outer surface of bottle up to 50 μm in the thickness direction.

In the polyester hollow molded bottle of the invention, when a density of a part ranging from the outer surface up to 50 μm inward is d1 [kg/m$^3$], and a density of a part ranging from the inner surface up to 50 μm inward is d2 [kg/m$^3$], Δd=d1−d2 is not less than −7 kg/m$^3$ and not more than 7 kg/m$^3$.

When the polyester resin is polyethylene terephthalate, d1 is preferably 1370 to 1375 kg/m$^3$. Likewise, d2 is preferably 1373 to 1378 kg/m$^3$, and more preferably 1376 to 1378 kg/m$^3$.

The absolute value of the difference between d1 and d2 may be favorably 7 kg/m$^3$ or less, d1>d2 being more preferable.

The reason for having such difference between the densities at the inner side and the outer side is that a preform is usually heated from the outer side by a heater, and thus the temperature at the inner side of the preform is lower than that at the outer side after heating.

For the method of heating the preform, a heater utilizing radiation in the near infrared and mid-infrared region (wavelength of 900 to 2000 nm) is generally used, but preferred is a method of reducing the temperature difference between the inner side and the outer side of the preform by heating the inner side effectively in order to suppress the difference between the densities at the inner side and the outer side as much as possible. For example, a method of heating for a longer time by suppressing the heater output, a method of inserting a heater or a metal rod into the preform as described in JP-A-5-200843, a method of heating by using infrared rays of long wavelengths, for which polyester has higher absorption efficiency, and the like are preferred, and a method of combining these is more preferred.

[Manufacturing Conditions]

The hollow blow molding method to obtain the hollow bottle of the invention will be described below in detail.

(Density of Raw Material)

The polyethylene terephthalate raw material used in the molding of hollow product usually has a density in the range of 1390 to 1420 kg/m$^3$.

(Temperature of Preform Preheating)

The polyethylene terephthalate preform obtained by injection molding may be subjected to a course of preheating at a temperature lower than the blow molding temperature, before carrying out the hollow blow molding. In order to adjust the surface density after molding into a hollow product to fall within the range of the invention, the preheating temperature is preferably in the range of 50 to 80° C.

(Temperature of Preform Molding)

When a temperature at the outer surface of the preform is T1, and a temperature at the inner surface of the preform is T2 upon molding, T1 is preferably 120 to 160° C., and more preferably 130 to 140° C. Likewise, T2 is preferably 110 to 150° C., and more preferably 120 to 140° C. When the preform temperature is within the above-mentioned range, the density at the outer surface d1 and the density at the inner surface d2 of the hollow product upon blow molding can be adjusted to fall within the range of the invention, which is preferable. As T1 and T2 are increased within the above-mentioned range, crystallization proceeds, and d1 and d2 respectively tend to increase.

The difference in the temperature of the preform molding preferably satisfies the relationship: $-10°\ C. \leqq (T2-T1) \leqq 10°\ C.$ When the temperature difference exceeds 10° C., the difference in the densities of the outer surface and the inner surface may exceed 7 kg/m$^3$.

For the heating of the preform, a method of using a near infrared heater, a method of using a heater utilizing long wavelength infrared (far infrared), for which polyester has high absorption efficiency, a method of inserting a heater into the preform, and the like can be used.

The time for preform heating is preferably 50 to 180 seconds, more preferably 60 to 180 seconds, in the case of using a near infrared heater. In the case of using an internal heater or a far infrared heater, the heating time may be shorter than the above range.

(Stretch Ratio)

A stretch ratio upon hollow blow molding of the preform is preferably 8 to 10 folds. When the stretch ratio is within the range of 8 to 10 folds, the obtained hollow product has a surface density within the range of the invention, which is preferable. When the stretch ratio exceeds 10 folds, particularly the density of the inner surface d2 decreases such that d2 may be less than 1373 kg/m$^3$, or (d1−d2) may exceed 7 kg/m$^3$.

The stretch ratio is indicated as an areal stretch ratio obtained as the product of the stretch ratio in MD direction (preform's circumferential direction) and the stretch ratio in TD direction (perpendicular direction).

The length in the MD direction is measured at the center in the thickness direction of the preform and the hollow bottle. For example, when a preform having an external diameter of 25.0 mm, an internal diameter of 18.0 mm, an external height of 72.0 mm and an internal height of 69 mm is molded to a hollow product having an external diameter of 66.5 mm and a height of 185 mm (height of the stretched portion at the base of the vent plug portion), the following ratio is determined:

(stretch ratio in the circumferential direction)×(stretch ratio in the height direction)=66.5/((25.0+18.0)/2)×185/((72+69)/2)=8.1.

(Mold Temperature)

The mold temperature for the hollow blow molding is preferably 130 to 160° C. When the mold temperature is within the above-mentioned range, the surface density of the obtained hollow product can be adjusted to fall within the range of the invention, which is preferable. When the mold temperature is lower than 130° C., the density of the outer surface d1 may be less than 1370 kg/m$^3$.

After the hollow blow molding, the bottle may be subjected to heat setting, by which the bottle is heat treated at a temperature in the range of 130 to 160° C. Heat setting allows further progress of crystallization, thereby further enhancing the heat resistance. However, since heat setting increases mainly the density of the outer surface, Δd may increase to a value beyond the range of the invention.

(Sample for Measurement)

According to the invention, the densities at the inner and outer surfaces used are the values for the parts ranging from the respective surfaces up to 50 μm in the thickness direction.

At a height ranging from 50 mm to 100 mm from the bottom of the hollow product, a sample having a width of about 15 mm is cut from the body portion of the hollow product, and slices having a thickness of 50 μm are respectively cut out from the inner surface and the outer surface to be used in the measurement of density. For the body portion, samples are taken from curved parts (cylindrical bottle) having no unevenness or flexion, or from planar parts (angular bottle).

(Measurement of Density)

The density is measured according to JIS K7112 using a density gradient tube.

EXAMPLES

Hereinafter, the present invention will be described with reference to Examples, but the invention is not limited in any way to these examples.

Example 1

Manufacture of Polyester

To a reactor, a slurry prepared by mixing high purity terephthalic acid and ethylene glycol was continuously supplied with stirring under the conditions of a temperature of 260° C. and a pressure of 0.9 kg/cm$^2$-G in a nitrogen atmosphere, to perform an esterification reaction. The high purity terephthalic acid and ethylene glycol were supplied at rates of 6458 parts by weight/hr and 2615 parts by weight/hr, respectively, and the reaction was carried out under the condition that 33500 parts by weight of the reaction liquid was retained in the reactor upon steady operation.

In the esterification reaction, a liquid mixture of water and ethylene glycol was distilled off. The esterification reaction product (low condensate) was continuously drawn out of the reactor so that the average residence time was controlled to be 3.5 hours.

The oligomeric polycondensate of ethylene glycol and terephthalic acid obtained above had a number average molecular weight of 600 to 1300 (trimer to pentamer).

A germanium catalyst solution was added to the low condensate thus obtained, and a liquid phase polycondensation reaction was carried out under the condition of 285° C. and 1 Torr. The time required for the intrinsic viscosity of the obtained amorphous polyethylene terephthalate to reach 0.55 dl/g was 50 minutes.

Furthermore, this polyethylene terephthalate resin, being in a pellet form, was subjected to solid phase polycondensation at 210° C. in the presence of circulating nitrogen gas. The intrinsic viscosity of the obtained polyethylene terephthalate was 0.76 dl/g.

(Molding of Preform)

The obtained polyethylene terephthalate was dried using a dehumidification air dryer at 170° C. for 4 hours. The amount of moisture in the resin after drying was 40 ppm or less. The dried polyethylene terephthalate was molded using an injection molding machine LX160 manufactured by Husky Injection Molding Systems, Ltd., to obtain a preform having a weight of 32 g. The dried polyethylene terephthalate was introduced into the injection molding machine at 160° C.; while the preset temperature of the cylinder was 285 to 290° C., the molding cycle was in approximately 22 seconds, and the residence time was 140 seconds.

(Molding of Bottle)

The obtained preform was subjected to blow molding by introducing the preform into a blow molding machine manufactured by SIG Corpoplast GmbH Co. & KG, and heating with an infrared heater for about 80 seconds until the temperature of the outer surface of the preform reached 130° C., with the bottle production rate per mold being 400 bottles/hr.

The preform had a dimension such as an external diameter of 25.0 mm, an internal diameter of 18.0 mm, an external height of 72.0 mm and an internal height of 69 mm. This preform was molded to a round hollow bottle having an external diameter of 66.5 mm, a height of 185 mm (height of the stretched portion at the base of the vent plug portion), and a capacity of 500 ml. Thus, the stretch ratio was 8.1 folds. The thickness of the body portion was 300 μm.

The temperature of the preform outer surface was 130° C., while the temperature of the preform inner surface was 120° C. The mold temperature was 150° C. then.

(Method of Measuring Bottle Heat Resistance: Rate of Heat Shrinkage)

The molded bottle was preserved in an oven at 40° C. and at a relative humidity of 90% for one week. The capacity of the bottle was measured with water at 23° C. (I). After removing the water in the bottle, the bottle was filled with hot water at 87, 95 or 100° C. and stoppered tightly with a cap. The bottle was laid sideways for 15 seconds and then was turned upside down. After letting the bottle to stand for 4 minutes and 45 seconds, the bottle was contacted with water, and the content of the bottle was cooled to room temperature. The cooling time was 30 minutes.

The content of the bottle was removed, and the bottle body portion and the shoulder portion were checked for any deformation. Next, the capacity of the bottle was measured with water at 23° C. (II). The rate of change in the capacity was determined from the capacity (I) of the bottle before the filling of hot water.

$$\text{Rate of change in capacity (\%)} = [(I-II)/I] \times 100$$

The case where no deformation was observed in the body portion and the shoulder portion, and the case where the rate of change in the capacity was 2% or less, were considered to be acceptable. The bottle capacity was determined by converting the weight of the filled water to its volume using the density of the water at the same temperature as that of the filled water.

(Measurement of Bottle Density)

The sample for measurement was cut from the bottle body portion at a height of 50 to 80 mm from the bottom, and slices were taken by cutting the sample along the direction parallel to the surface, on the outer surface side (outer side) and the inner surface side (inner side), respectively, by using a sharp knife blade. The thickness of each slice was about 50 μm.

The density was measured by using a density gradient tube. The density gradient was provided by respectively adjusting solutions having lower densities and solutions having higher densities, using zinc chloride, hydrochloric acid and water, and further mixing the solutions, and the density gradient was adjusted to the range from 1360 kg/m$^3$ to 1411 kg/m$^3$. The sample was wetted with methanol and then placed carefully in the gradient tube. At least two samples were subjected to the measurement, and the average was taken as the measured value.

(Measurement of Haze)

The sample for measurement used was a 30 mm-square sample, which was cut from the bottle body portion at a height of 40 to 90 mm from the bottom, with a thickness of 300 μm. The haze was measured using a Haze meter NDH-20D manufactured by Nippon Denshoku Kogyo Co., Ltd., and evaluated from as an average of three measurements. The haze value was 3%. The results for the evaluation of the bottle surface density and heat resistance are shown in Table 1.

Comparative Example 1

A polyester resin bottle was molded in the same manner as in Example 1, except that the bottle production rate per mold was 800 bottles/hr, the heating time was 40 seconds, and the temperature of the preform outer surface was 115° C. The temperature of the preform inner surface was 100° C. The measurement of the heat resistance and density of the obtained bottle was carried out in the same manner as in Example 1. The haze value was 3%. The results are shown in Table 1.

The shapes of the preform and the hollow bottle were the same as those in Example 1, and consequently the stretch ratio was 8.1 folds.

Comparative Example 2

A polyester resin bottle was molded in the same manner as in Comparative Example 1, except that the temperature of the preform outer surface was 120° C., and the temperature of the inner surface was 105° C. The haze value was 7%. The results are shown in Table 1.

The shapes of the preform and the hollow bottle were the same as those in Example 1, and consequently the stretch ratio was 8.1 folds.

Reference Example 1

As a reference example, a bottle filled with fruit juice beverage was purchased, and the bottle surfaces were sampled in the same manner as in Example 1. The results of measuring the sample densities are shown in Table 2. The shape was a round hollow bottle, the capacity was 500 ml, and the thickness at the body portion was 280 μm.

TABLE 1

| | Preform Temp. (° C.) | Blow Mold Temp. (° C.) | Bottle Production Rate (bottles/hr) | Density (kg/m$^3$) Outer surface | Density (kg/m$^3$) Inner surface | Difference in densities between inner & outer surfaces | Bottle Heat Resistance Hot water Temp. (° C.) | Bottle Heat Resistance Deformation in body portion and shoulder portion | Bottle Heat Resistance Rates of change in content weight | Rate |
|---|---|---|---|---|---|---|---|---|---|---|
| Ex. 1 | 130 | 150 | 400 | 1370 | 1373 | 3 | 87 | Absent | 0.5% | ○ |
| | | | | | | | 95 | Absent | 1.0% | ○ |
| | | | | | | | 100 | Absent | 1.2% | ○ |
| Comp. Ex. 1 | 115 | 150 | 800 | 1375 | 1366 | 9 | 87 | Absent | 1.0% | ○ |
| | | | | | | | 95 | Present | 2.5% | X |
| | | | | | | | 100 | Present | 3.7% | X |
| Comp. Ex. 2 | 120 | 150 | 800 | 1375 | 1368 | 7 | 87 | Absent | 1.0% | ○ |
| | | | | | | | 95 | Present | 2.0% | ○ |
| | | | | | | | 100 | Present | 3.2% | X |

Rate: ○ Acceptable, X Unacceptable (The preform temperature indicates the outer surface temperature.)

TABLE 2

| | Density (kg/m³) | | |
| --- | --- | --- | --- |
| | Outer surface | Inner surface | Difference in densities between inner & outer surfaces |
| Ex. 1 | 1370 | 1373 | 3 |
| Ref. Ex. 1 | 1375 | 1366 | 9 |

The invention claimed is:

1. A hollow bottle formed by blow molding polyethylene terephthalate, which has a thickness of a bottle body portion in the range of 200 to 400 μm, and satisfies that d1=1370 to 1375 kg/m³ and d2=1373 to 1378 kg/m³, and that Δd=d1−d2 is not less than −3 kg/m³ and not more than 3 kg/m³, with d1 [kg/m³] being a density of a part of the body portion ranging from an outer surface up to 50 μm inward, and d2 [kg/m³] being a density of a part of the body portion ranging from an inner surface up to 50 μm inward, and wherein during the blow molding or after the blow molding, the bottle is subjected to heat-setting at a temperature in the range of 130 to 160° C.

2. The hollow bottle according to claim 1, wherein a ratio of a difference between a capacity of the bottle measured after molding and a capacity of the bottle measured after filling hot water at 100° C. therein and cooling to the capacity of the bottle after molding is 2% or less.

3. A method of producing a hollow bottle by blow molding a preform made of polyethylene terephthalate, which comprises setting an outer surface temperature of the preform, T1, to the range of 120 to 160° C., setting an inner surface temperature of the preform, T2, to the range of 110 to 150° C., and carrying out blow molding in a temperature range satisfying that −10° C.≦(T2−T1)≦10° C., and wherein during the blow molding or after the blow molding, the bottle is subjected to heat-setting at a temperature in the range of 130 to 160° C.

* * * * *